J. BAKER.
Combined Scoops and Sifters.
No. 148,800. Patented March 24, 1874.
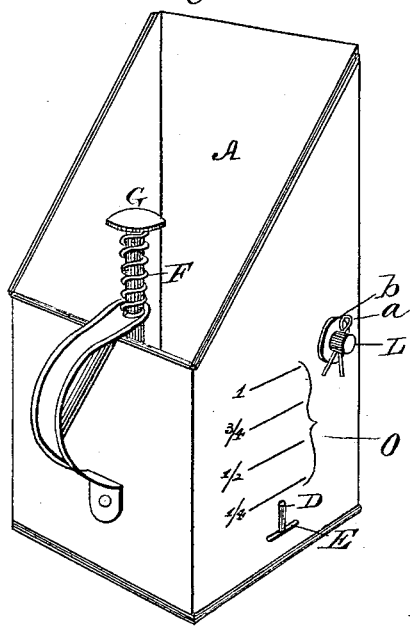
Fig. 1.
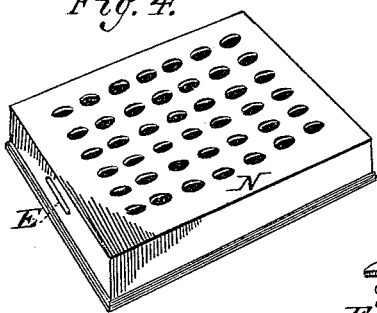
Fig. 4.
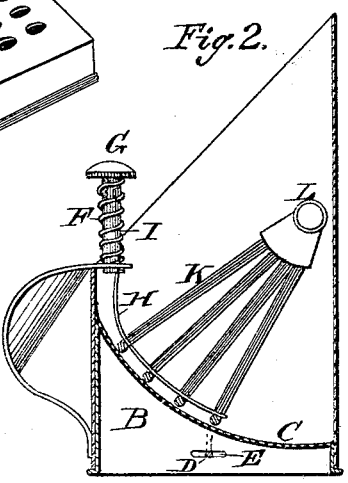
Fig. 2.
Fig. 3.
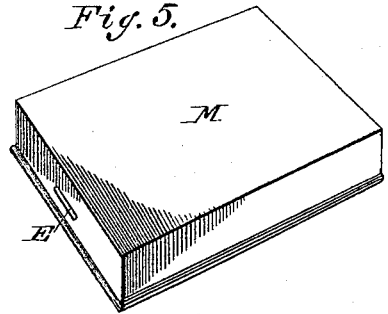
Fig. 5.
Witnesses.
H. W. Dodge
J. C. Wildman
Inventor.
Joseph Baker,
by Dodge & Son
Attys.

UNITED STATES PATENT OFFICE.

JOSEPH BAKER, OF ROCHESTER, NEW YORK.

IMPROVEMENT IN COMBINED SCOOPS AND SIFTERS.

Specification forming part of Letters Patent No. 148,800, dated March 24, 1874; application filed December 15, 1873.

*To all whom it may concern:*

Be it known that I, JOSEPH BAKER, formerly of Canada, but now residing at Rochester, in the county of Monroe and State of New York, have invented certain Improvements in Combined Scoop, Sifter, and Colander, of which the following is a specification:

My invention relates to a combined scoop and sifter; and the invention consists in certain improvements on the device patented by me February 7, 1871, No. 111,605, whereby the implement is rendered more useful and available, as hereinafter explained.

Figure 1 is a perspective view; Fig. 2, a longitudinal central sectional view; and Figs. 3, 4, and 5 represent portions detached.

In my former patent the implement consisted of a sheet-metal body, A, of the form shown in Fig. 1 of the accompanying drawing, with a concave sieve, C, arranged in its lower portion, and an agitator, K, arranged to vibrate to and fro over the sieve, as represented in Fig. 2. All these parts I construct as before, except that in the former case the agitator R was secured permanently to the body, while in the present instance I make it detachable, so that it can be removed and replaced at will. This may be accomplished in various ways, one of which is shown in the drawings.

In Fig. 2, L represents one of the pivots on which the agitator is suspended, and, as shown in Fig. 1, these pivots extend through the sides of the body, and are held in place by a small spring-key, *a*, there being a washer, *b*, between the pin or key *a* and the body, though this latter is not absolutely necessary. By withdrawing the pins or keys *a*, the pivots L can be taken out, and then by unscrewing the knob G the agitator K is left free, and can be removed.

It is obvious that, instead of using the loose pivots L, pivots may be soldered or otherwise permanently secured to the extremities of the agitator, and made to fit in the holes in the body A. When thus arranged, it is only necessary to spring the sides of the agitator sufficiently to draw the pivots out of their holes, which can be readily done when necessary to remove it from the scoop, the sides being pressed inward slightly, when it is replaced in like manner.

As formerly constructed, the scoop had no bottom but such as was formed by the sieve. I now provide a small tray, M, shown reversed, and in perspective in Fig. 5, it being made of the proper size to fit into the bottom of the body A when the sieve is removed, it being provided with slots E at the sides, through which the wire D is inserted when in place, and by which it is secured to the body in the same manner as the sieves.

In order to enable the implement to be used as a cullender also, I provide a similar tray or bottom piece, N, suitably perforated, as shown in Fig. 4, which can be inserted in the place of the tight bottom M when the latter is removed, it being secured in the same way as the other parts are—by the wire D. Instead of the slots E and wire D other means may be used for securing these detachable bottoms and sieves in place. For instance, a slight indentation may be made in the inner face of their sides, which will form a corresponding protuberance on their outer surfaces, and these made to engage in corresponding recesses in the sides of the body A, the thin metal being sufficiently elastic to permit them to be sprung out and detached when the parts are to be removed; or one or more spring-catches may be arranged to hold the detachable bottoms and sieves in place.

As it is very desirable in preparing cake and other culinary compounds to have a convenient means of weighing or measuring the flour and sugar, I have provided therefor, by marking graduations upon the side of the body A, as shown in Fig. 1, and placing opposite each mark the weight of the flour that the scoop will hold when filled to that mark. When filled to the lower mark the quantity will be one-fourth of a pound, and so on up to one pound. While I have indicated only graduations indicating the pound divided into fourths, it is obvious that smaller subdivisions may be indicated, if desired, though these are ample for all ordinary purposes. Sugar being twice as heavy as flour, only one-half the quantity of the latter will be used for the same weight—that is to say, to obtain a pound of sugar the scoop will only be filled to the half-pound mark, and in like manner for other weights of the same.

It will thus be seen that by these improvements, the implement is very much improved, and its capacity largely increased. By providing a series of sieves of different degrees of fineness, not only flour but also other substances can be sifted, and by making bottoms with different-sized perforations it can be used not only as a cullender but also as a strainer for different substances, and, when desired, the tight bottom can be inserted, when it forms a complete scoop, the material not being liable to work through as when the sieve was used as a bottom.

By making the agitator detachable it can be removed when the implement is to be used simply as a scoop, or as a colander or strainer, and it can also be cleaned or washed when necessary.

By these improvements I am enabled to produce an implement that is adapted to a variety of uses, and that is exceedingly useful as a household article.

Having thus described my invention, what I claim, is—

1. A scoop, substantially such as described, in combination with the detachable agitator K, the whole being constructed and arranged to operate as set forth.

2. In combination with the scoop or body A, the detachable bottom M, constructed and arranged for use, as set forth.

3. The perforated bottom N, constructed substantially as described, whereby it can be used in connection with the body A, as set forth.

JOSEPH BAKER.

Witnesses:
H. SARGENT,
F. A. HITCHCOCK.